United States Patent
Machida et al.

(10) Patent No.: US 10,161,688 B2
(45) Date of Patent: Dec. 25, 2018

(54) HEAT STORAGE APPARATUS, METHOD FOR STORING HEAT, AND METHOD FOR PRODUCING HEAT STORAGE APPARATUS

(71) Applicant: Panasonic Intellectual Property Management Co., Ltd., Osaka (JP)

(72) Inventors: Hironobu Machida, Nara (JP); Motohiro Suzuki, Osaka (JP); Shinsuke Takeguchi, Osaka (JP); Kentaro Shii, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 717 days.

(21) Appl. No.: 14/661,753

(22) Filed: Mar. 18, 2015

(65) Prior Publication Data

US 2015/0285566 A1    Oct. 8, 2015

(30) Foreign Application Priority Data

Apr. 2, 2014   (JP) ................................. 2014-076266

(51) Int. Cl.
*F28D 20/02*    (2006.01)
*C23F 1/10*    (2006.01)
(Continued)

(52) U.S. Cl.
CPC ........... *F28D 20/025* (2013.01); *B01D 9/005* (2013.01); *B01D 9/0013* (2013.01); *C09K 5/063* (2013.01);
(Continued)

(58) Field of Classification Search
CPC .... F28D 20/025; F28D 20/021; F28D 20/028; B01D 9/0013; B01D 9/005; C09K 5/063;
(Continued)

(56) References Cited

U.S. PATENT DOCUMENTS 3,877,993 A * 4/1975 Davis .................... H01M 4/628
429/201
3,945,849 A * 3/1976 Hoffman ............... H01M 4/628
429/201

(Continued)

FOREIGN PATENT DOCUMENTS

JP    54-102297    8/1979
JP    61-145274    7/1986
(Continued)

OTHER PUBLICATIONS

The Extended European Search Report dated Nov. 20, 2015 for the related European Patent Application No. 15159769.7.
(Continued)

*Primary Examiner* — Tho V Duong
(74) *Attorney, Agent, or Firm* — McDermott Will & Emery LLP

(57) ABSTRACT

A heat storage apparatus according to the present disclosure includes a heat storage material and a member. The heat storage material forms a clathrate hydrate by cooling. The member has a surface with a plurality of holes. In the case that the lattice constant of the clathrate hydrate is denoted by L and the outside diameter of a cage included in the clathrate hydrate is denoted by D, the plurality of holes are spaced at intervals of 1L to 10L, and each of the plurality of holes has a hole diameter of 1D to 20D.

4 Claims, 5 Drawing Sheets

(51) Int. Cl.
  *C09K 5/06* (2006.01)
  *B01D 9/00* (2006.01)
  *F28F 13/18* (2006.01)
  *F28F 21/08* (2006.01)
  *F24F 5/00* (2006.01)

(52) U.S. Cl.
  CPC .............. *C23F 1/10* (2013.01); *F24F 5/0017* (2013.01); *F28D 20/021* (2013.01); *F28D 20/028* (2013.01); *F28F 13/185* (2013.01); *F28F 21/081* (2013.01); *F28F 21/084* (2013.01); *F28F 21/085* (2013.01); *Y02E 60/145* (2013.01); *Y02E 60/147* (2013.01)

(58) Field of Classification Search
  CPC ......... C23F 1/10; F24F 5/0017; F28F 13/185; F28F 21/081
  See application file for complete search history.

(56) References Cited

U.S. PATENT DOCUMENTS

| | | | | |
|---|---|---|---|---|
| 6,083,417 | A * | 7/2000 | Gomi | C09K 5/00 165/10 |
| 7,875,749 | B2 * | 1/2011 | Tomura | C09K 5/063 564/281 |
| 2001/0047662 | A1 | 12/2001 | Takao et al. | |
| 2002/0031339 | A1 | 3/2002 | Hirano | |
| 2007/0100178 | A1 * | 5/2007 | Carstens | B01J 7/02 585/15 |
| 2010/0187467 | A1 * | 7/2010 | Ono | C09K 5/063 252/71 |
| 2013/0086938 | A1 * | 4/2013 | Higashiyama | B65D 7/42 62/524 |

FOREIGN PATENT DOCUMENTS

| | | |
|---|---|---|
| JP | 1-153785 | 6/1989 |
| JP | 9-291272 | 11/1997 |
| JP | 2002-081878 | 3/2002 |
| JP | 2007-246778 | 9/2007 |

OTHER PUBLICATIONS

Dipendu Saha et al: "Accelerated Formation of THF-H2 Clathrate Hydrate in Porous Media", LANGMUIR, vol. 26, No. 11, Jun. 1, 2010, pp. 8414-8418.

Praveen Linga et al: "Enhanced rate of gas hydrate formation in a fixed bed column filled with sand compared to a stirred vessel", Chemical Engineering Science, Oxford, GB, vol. 68, No. 1, Oct. 12, 2011, pp. 617-622.

* cited by examiner

HEAT STORAGE APPARATUS, METHOD FOR STORING HEAT, AND METHOD FOR PRODUCING HEAT STORAGE APPARATUS

BACKGROUND

1. Technical Field

The present disclosure relates to a heat storage apparatus, a method for storing heat, and a method for producing a heat storage apparatus.

2. Description of the Related Art

Hitherto, heat storage materials that store cold heat using latent heat have been known. Techniques for suppressing supercooling have also been reported.

Japanese Unexamined Patent Application Publication No. 54-102297 describes a heat storage apparatus including a heat storage material and a crystallization aid. As the heat storage material, a first clathrate compound of water, such as ethyl chloride hydrate, having a dodecahedral structure as a basic crystal structure is used. The crystallization aid promotes the crystallization of the heat storage material. As the crystallization aid, a second clathrate compound of water, such as a hydrate of a tetrabutylammonium salt, having a dodecahedral structure as a basic crystal structure is used, the second clathrate compound of water being different from the first clathrate compound of water. The heat storage apparatus is provided with a porous partition to prevent the mixing of the heat storage material and the crystallization aid.

Japanese Patent No. 3324392 describes a heat storage material containing tetrabutylammonium nitrate hydrate serving as a main heat storage agent and a hydrate of a tetraalkylammonium salt which has a melting point of 20° C. or higher and which serves as a supercooling preventive agent. The supercooling preventive agent suppresses the supercooling of the main heat storage agent. To prevent the mixing of the main heat storage agent and the supercooling preventive agent, for example, a porous material is impregnated with the supercooling preventive agent. Furthermore, the mixing of the main heat storage agent and the supercooling preventive agent is prevented over a long period of time by covering a surface of the porous material with an organic coating and forming a small hole in the coating.

Japanese Unexamined Patent Application Publication No. 1-153785 describes a cold storage agent containing a guest agent, such as CFC R11, and a host agent, such as water, in which a clathrate is formed when the cold storage agent is cooled. The cold storage agent contains a metal element, such as Fe, in group II of the periodic table as a supercooling preventive agent.

SUMMARY

According to the foregoing documents of the related art, there is room to study another technique for reducing the degree of supercooling of a heat storage material that forms a clathrate hydrate by cooling.

One non-limiting and exemplary embodiment provides a novel heat storage apparatus that can suppress the supercooling of a heat storage material that forms a clathrate hydrate by cooling.

In one general aspect, the techniques disclosed here feature a heat storage apparatus including a heat storage material that forms a clathrate hydrate by cooling, and a member having a surface with a plurality of holes, the plurality of holes being spaced at intervals of 1L to 10L, and each of the plurality of holes having a hole diameter of 1D to 20D, in the case that the lattice constant of the clathrate hydrate is denoted by L and the outside diameter of a cage included in the clathrate hydrate is denoted by D.

In the foregoing heat storage apparatus, it is possible to reduce the degree of supercooling of the heat storage material that forms a clathrate hydrate by cooling.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Figure 1:
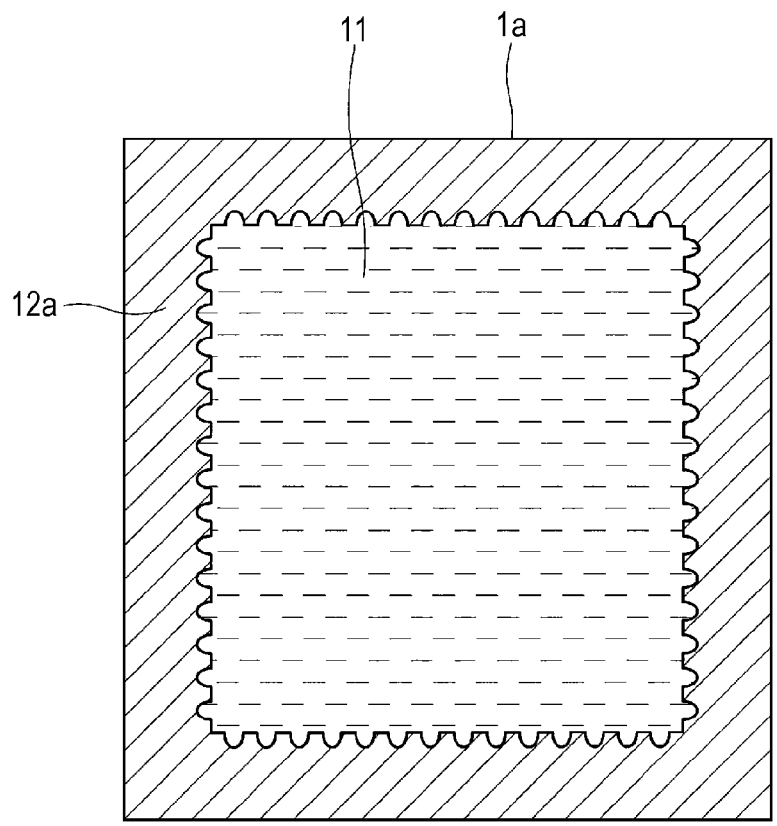
FIG. 1 is a cross-sectional view of a heat storage apparatus according to an example of an embodiment.

Heat storage apparatuses using ice as a heat storage material have been known. For example, techniques have been known in which ice is produced using low-cost nighttime power and cold heat stored in the ice is used for refrigerated air-conditioning in the daytime. Ice has a large heat of fusion (about 334 J/g) and is an excellent material as a heat storage material. Ice is produced by performing cooling to about −5° C. because the melting point of ice is 0° C. Thus, in the case where ice is produced with a refrigerator, the coefficient of performance (COP) of the refrigerator is not easily increased. In this case, for example, COP is reduced to about 20%, compared with the case where the refrigerator is operated at 0° C. Thus, there is room for improvement in this technique from the viewpoint of reducing energy consumption.

A material having a melting point of 5° C. to 15° C. is preferably used as a heat storage material for refrigerated air-conditioning from the viewpoint of reducing the energy consumption. However, single compounds having melting points in the foregoing temperature range are limited to specific compounds, such as paraffin compounds, for example, tetradecane (melting point: 5° C., heat of fusion: 210 J/g) and pentadecane (melting point: 9.9° C., heat of fusion: 158 J/g). It is difficult to industrially produce high-purity tetradecane and pentadecane at low cost. Furthermore, paraffin compounds have low thermal conductivity and low densities in liquid states; hence, it is difficult to use large amounts of paraffin compounds. Therefore, it is difficult to use paraffin compounds, for example, tetradecane and pentadecane, as heat storage materials for refrigerated air-conditioning.

Among materials that form clathrate hydrates by cooling, for example, clathrate hydrates of quaternary ammonium salts, there are materials having melting points higher than 0° C. For example, the clathrate hydrate of tetrabutylammonium bromide (TBAB) has a melting point of about 5 to about 12° C. The clathrate hydrate of tetrabutylammonium chloride (TBAC) has a melting point of about 15° C. The clathrate hydrate of tetrabutylammonium fluoride (TBAF) has a melting point of about 25° C. Thus, the energy consumption is likely to be reduced by the use of materials that form clathrate hydrates by cooling as heat storage materials for refrigerated air-conditioning in place of ice. However, materials that form clathrate hydrates by cooling exhibit large degrees of supercooling. In some cases, these materials need to be cooled to −6° C. or lower for crystallization. The use of such a material as a heat storage material is less likely to reduce energy consumption because the heat storage material needs to be supercooled for the crystallization of the heat storage material.

As described above, the techniques for suppressing the supercooling of the heat storage materials are reported.

In the heat storage apparatus described in Japanese Unexamined Patent Application Publication No. 54-102297, however, when the heat storage material is exposed to a high temperature, for example, 40° C. or higher, the crystallization aid is dissolved in the heat storage material, so that the supercooling preventive effect is less likely to be provided.

In the heat storage material described in Japanese Patent No. 3324392, when the heat storage material is exposed to a high temperature, for example, 40° C. or higher, the supercooling preventive agent is dissolved in the heat storage material, so that the supercooling preventive effect is less likely to be provided.

In the heat storage agent described in Japanese Unexamined Patent Application Publication No. 1-153785, a material that can be used as a supercooling preventive agent is limited to a metal in group II of the periodic table.

A first aspect of the present disclosure provides a heat storage apparatus including a heat storage material that forms a clathrate hydrate by cooling, and a member having a surface with a plurality of holes, the plurality of holes being spaced at intervals of 1L to 10L, and each of the plurality of holes has a hole diameter of 1D to 20D, in the case that the lattice constant of the clathrate hydrate is denoted by L and the outside diameter of a cage included in the clathrate hydrate is denoted by D.

According to the first aspect, it is speculated that the surface of the member with the plurality of holes serves as a scaffold used to form the clathrate hydrate, the plurality of holes being spaced at intervals of 1L to 10L, and each of the plurality of holes having a hole diameter of 1D to 20D. Thus, the formation of the clathrate hydrate, i.e., the crystallization of the heat storage material, is promoted, thereby reducing the degree of supercooling of the heat storage material. Furthermore, the member having a predetermined surface structure, which is a relatively simple structure, reduces the degree of supercooling of the heat storage material.

The first aspect of the present disclosure may be used in combination with a crystallization promoting agent or a supercooling preventive agent. If the agent is used, the formation of the clathrate hydrate is promoted with the member. Thus, the amount of the crystallization promoting agent or the supercooling preventive agent used can be reduced, reducing the extent of the foregoing problems described in Japanese Unexamined Patent Application Publication No. 54-102297, Japanese Patent No. 3324392, and Japanese Unexamined Patent Application Publication No. 1-153785. Hence, the first aspect of the present disclosure may be used in combination with the crystallization promoting agent or the supercooling preventive agent.

A second aspect of the present disclosure provides the heat storage apparatus according to the first aspect, in which the heat storage material is an aqueous solution of a quaternary ammonium salt. According to the second aspect, the heat storage material has excellent properties as a heat storage material for refrigerated air-conditioning. It is thus possible to provide the heat storage apparatus suitable for, for example, a refrigerated air-conditioning system.

A third aspect of the present disclosure provides the heat storage apparatus according to the second aspect, in which the quaternary ammonium salt is a tetraalkylammonium salt including at least one alkyl group selected from the group consisting of a methyl group, an ethyl group, a n-propyl group, an isopropyl group, a n-butyl group, an isobutyl group, a n-pentyl group, an isopentyl group, a n-hexyl group, an isohexyl group, a n-heptyl group, an isoheptyl group, and a tri-n-butylpentyl group and at least one ammonium salt selected from the group consisting of an ammonium bromide salt, an ammonium chloride salt, an ammonium fluoride salt, an ammonium nitrate, an ammonium nitrite salt, an ammonium chlorate salt, an ammonium perchlorate, an ammonium bromate salt, an ammonium iodate salt, an ammonium carbonate salt, an ammonium phosphate salt, an ammonium tungstate salt, an ammonium sulfate salt, an ammonium hydroxide salt, an ammonium carboxylate salt, an ammonium dicarboxylate salt, an ammonium sulfonate salt, and an ammonium disulfonate salt. According to the third aspect, the heat storage material has excellent properties as a heat storage material for refrigerated air-conditioning. It is thus possible to provide the heat storage apparatus suitable for, for example, a refrigerated air-conditioning system.

A fourth aspect of the present disclosure provides the heat storage apparatus according to the third aspect, in which each of the plurality of holes has a hole diameter of 0.7 nm to 1.0 nm, and the plurality of holes are spaced at intervals of 1.0 nm to 2.5 nm. According to the fourth aspect, when the heat storage material is the heat storage material described in the third aspect, the member has a surface suitable for the promotion of the formation of the clathrate hydrate of the heat storage material.

A fifth aspect of the present disclosure provides a method for storing heat in a heat storage material, the method including: bringing the heat storage material that into contact with a member having a plurality of holes, the heat strage material forming a clathrate hydrate by cooling; and cooling the heat storage material and the member to form at least part of a cage of the clathrate hydrate in the plurality of holes and to grow the cage into the clathrate hydrate, in which in the case that the lattice constant of the clathrate hydrate is denoted by L and the outside diameter of a cage included in the clathrate hydrate is denoted by D, the plurality of holes are spaced at intervals of 1L to 10L, and each of the plurality of holes has a hole diameter of 1D to 20D.

According to the fifth aspect, part of the cage of the clathrate is formed in the plurality of holes, thereby promoting the formation of the clathrate hydrate, i.e., the crystallization of the heat storage material. Thus, the fifth aspect provides the method for storing heat, in which the degree of supercooling of the heat storage material is reduced.

A sixth aspect of the present disclosure provides a heat storage apparatus including a heat storage material being an aqueous solution of a quaternary ammonium salt, and a member with a surface composed of at least one material selected from the group consisting of copper, copper(I) oxide, copper(II) oxide, aluminum, zinc, and tin subjected to galvanic corrosion treatment, the surface being in contact with the heat storage material.

According to the sixth aspect, when the aqueous solution of the quaternary ammonium salt is used as the heat storage material, the member promotes the formation of a clathrate hydrate containing the quaternary ammonium salt as a guest, i.e., the crystallization of the heat storage material. This reduces the degree of supercooling of the heat storage material. The reason for this is presumably as follows: The quaternary ammonium salt reacts with dissolved oxygen in the aqueous solution to cause pitting corrosion on the surface of the member. The holes formed in the surface of the member promote the formation of the clathrate hydrate containing the quaternary ammonium salt as a guest. Furthermore, the heat storage material has excellent properties as a heat storage material for refrigerated air-conditioning. It is thus possible to provide the heat storage apparatus suitable for, for example, a refrigerated air-conditioning system.

A seventh aspect of the present disclosure provides the heat storage apparatus according to the sixth aspect, in which the quaternary ammonium salt is a tetraalkylammonium salt including at least one alkyl group selected from the group consisting of a methyl group, an ethyl group, a n-propyl group, an isopropyl group, a n-butyl group, an isobutyl group, a n-pentyl group, an isopentyl group, a n-hexyl group, an isohexyl group, a n-heptyl group, an isoheptyl group, and a tri-n-butylpentyl group and at least one ammonium salt selected from the group consisting of an ammonium bromide salt, an ammonium chloride salt, an ammonium fluoride salt, an ammonium nitrate, an ammonium nitrite salt, an ammonium chlorate salt, an ammonium perchlorate, an ammonium bromate salt, an ammonium iodate salt, an ammonium carbonate salt, an ammonium phosphate salt, an ammonium tungstate salt, an ammonium sulfate salt, an ammonium hydroxide salt, an ammonium carboxylate salt, an ammonium dicarboxylate salt, an ammonium sulfonate salt, and an ammonium disulfonate salt. According to the seventh aspect, the heat storage material has excellent properties as a heat storage material for refrigerated air-conditioning. It is thus possible to provide the heat storage apparatus suitable for, for example, a refrigerated air-conditioning system.

An eighth aspect of the present disclosure provides a method for producing a heat storage apparatus, the method including arranging a metal material composed of a metal, a metal oxide, or an alloy at a position where the metal material comes into contact with a heat storage material that forms a clathrate hydrate by cooling, bringing a solution that causes pitting corrosion into contact with a surface of the metal material with which the heat storage material comes into contact, to form a plurality of holes in the surface, and stopping the pitting corrosion.

According to the eighth aspect, it is possible to produce the heat storage apparatus including the member that promotes the formation of the clathrate hydrate of the heat storage material, the shape of the surface of the metal material being adjusted by the pitting corrosion and the stopping of the pitting corrosion.

Here, in the step A, any structure may be used as long as the metal material is arranged at the position where the metal material comes into contact with the heat storage material that forms the clathrate hydrate by cooling. Specifically, for example, a container composed of the metal material may be used to contain the heat storage material. Alternatively, the metal material may be arranged at a position in a container such that the metal material comes into contact with the heat storage material.

The order of the step A may be freely selected with respect to the steps B and C. The step A may be performed before or after the steps B and C.

A ninth aspect of the present disclosure provides the method according to the eighth aspect, in which stopping of the pitting corrosion, the pitting corrosion is stopped by stopping the supply of oxygen to the solution. According to the ninth aspect, the degree of the pitting corrosion on the surface of the metal material may be adjusted by the relatively simple method. It is thus possible to easily produce the heat storage apparatus including the member that promotes the formation of the clathrate hydrate.

A tenth aspect of the present disclosure provides the method according to the eighth aspect, in which the solution is a heat storage material that forms the clathrate hydrate by cooling. According to the tenth aspect, the heat storage material is also used as the solution that causes the pitting corrosion on the surface of the metal material, thus producing the heat storage apparatus including the member that promotes the formation of the clathrate hydrate of the heat storage material with a few resources. Furthermore, the solution after the production of the member may be directly used as the heat storage material.

An eleventh aspect of the present disclosure provides the method according to the tenth aspect, in which the heat storage material is an aqueous solution of a quaternary ammonium salt.

Embodiments of the present disclosure will be described below with reference to the attached drawings. The following description relates to an example of the present disclosure. The present disclosure is not limited thereto. In this specification, the term "heat storage" indicates that cold heat is stored. Heat storage apparatus As illustrated in FIG. 1, a heat storage apparatus 1a includes a heat storage material 11 and a member 12a. The heat storage material 11 forms a clathrate hydrate by cooling. The term "clathrate hydrate" indicates a clathrate compound containing water serving as a host. The heat storage material 11 has a melting point of, for example, 8° C. to 25° C. The heat storage material 11 is, for example, an aqueous solution of a quaternary ammonium salt, such as a tetraalkylammonium salt. An example of the quaternary ammonium salt is a tetraalkylammonium salt including at least one alkyl group selected from the group consisting of a methyl group, an ethyl group, a n-propyl group, an isopropyl group, a n-butyl group, an isobutyl group, a n-pentyl group, an isopentyl group, a n-hexyl group, an isohexyl group, a n-heptyl group, an isoheptyl group, and a tri-n-butylpentyl group and at least one ammonium salt selected from the group consisting of an ammonium bromide salt, an ammonium chloride salt, an ammonium fluoride salt, an ammonium nitrate, an ammonium nitrite salt, an ammonium chlorate salt, an ammonium perchlorate, an ammonium bromate salt, an ammonium iodate salt, an ammonium carbonate salt, an ammonium phosphate salt, an ammonium tungstate salt, an ammonium sulfate salt, an ammonium hydroxide salt, an ammonium carboxylate salt, an ammonium dicarboxylate salt, an ammonium sulfonate salt, and an ammonium disulfonate salt. The heat storage material 11 is, for example, an aqueous solution of at least one quaternary ammonium salt selected from the group consisting of a tetrabutylammonium salt, a tetrapentylammonium salt, a tetrapropylammonium salt, and a tetraethylammonium salt.

The aqueous solution of the quaternary ammonium salt forms a clathrate hydrate containing the quaternary ammonium salt serving as a guest by cooling. The melting point of the heat storage material 11 may be adjusted by changing the content of a guest material in the heat storage material 11. For example, in the case where the guest material in the heat storage material 11 is TBAB, the heat storage material 11 with a content of TBAB of 20% by weight, 30% by weight, or 40% by weight has a melting point of 8° C., 11° C., or 12° C., respectively. The heat storage material 11 may contain two or more quaternary ammonium salts. In this case, the use of the two or more quaternary ammonium salts enable the melting point of the heat storage material 11 to be adjusted. A clathrate hydrate with a content of TBAB of 40% by weight has a melting point of about 12° C. A clathrate hydrate with a content of TBAC of 35% by weight has a melting point of about 15° C. A clathrate hydrate with a content of TBAF of 30% by weight has a melting point of about 25° C. For example, in the case of the heat storage material 11 containing TBAB, TBAC, and TBAF, the melting point of the heat storage material 11 may be adjusted by appropriately determining the contents of TBAB, TBAC, and TBAF. Another example of the guest material in the heat storage material 11 is tetrahydrofuran.

Figure 2:
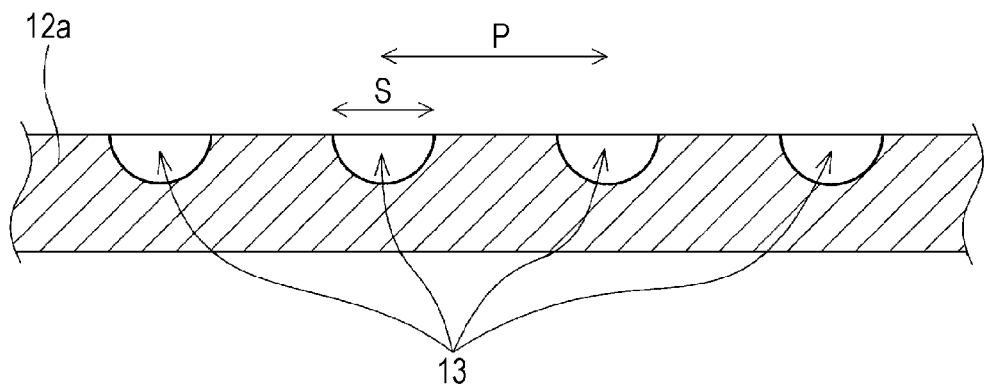
FIG. 2 is an enlarged fragmentary cross-sectional view of a member in contact with a heat storage material in the heat storage apparatus illustrated in FIG. 1.

As illustrated in FIG. 2, the member 12a has a surface with a plurality of holes 13 formed in order to promote the formation of the clathrate hydrate. At least part of the surface is in contact with the heat storage material 11 in the heat storage apparatus 1a. In the heat storage material 11, the lattice constant of the clathrate hydrate formed by cooling is denoted by L, and the outside diameter of a cage included in the clathrate hydrate is denoted by D. In this case, the plural holes 13 are spaced at intervals of 1L to 10L. In other words, the distance P between two of the holes 13 is in the range of 1L to 10L. The distance P used here indicates a distance between two straight lines which are perpendicular to the surface of the member 12a and which pass through the centers of the two of the holes 13. A distance P of 1L or more provides space for the formation of one lattice of the clathrate hydrate centered on a corresponding one of the holes 13. A distance P of 10L or less is likely to lead to the matching of the shape of clathrate hydrate structures formed centrally on adjacent holes 13, so that the structures are likely to coalesce with each other. A distance P more than 10L is less likely to lead to the matching of the shape of adjacent clathrate hydrate structures, so that the structures are less likely to coalesce into a larger clathrate hydrate. The distance P is preferably in the range of 1L to 5L and more preferably 1L to 3L. The reason for this is that a shorter distance P is more likely to the matching of the shape of adjacent clathrate hydrate structures, thus increasing the possibility of the coalescence therebetween. Each of the plural holes 13 has a hole diameter S of 1D to 20D. A diameter S of 1D or more provides space for the formation of a cage included in the clathrate hydrate in each of the holes 13. A diameter S of 20D or less inhibits the diffusion of a molecule of a guest material and molecules of water serving as a host with the inner wall of each of the holes 13 to promote the intermolecular interaction between the molecule of the guest material and the water molecules, thereby facilitating the formation of at least part of the cage of the clathrate hydrate. A hole diameter S more than 20D is less likely to inhibit the diffusion of the molecule of the guest material and the molecules of water serving as the host with the inner wall of each of the holes 13, thereby leading to difficulty in forming the cage of the clathrate hydrate. Each of the plural holes 13 preferably has a hole diameter S of 1D to 10D and more preferably 1D to 5D. The reason for this is that a smaller hole diameter S further inhibits the diffusion of the molecule of the guest material and the molecules of water serving as the host, thereby facilitating the formation of the cage of the clathrate hydrate. The plural holes 13 are arranged in the surface of the member 12a; hence, the hole diameter S is smaller than the distance between two adjacent holes 13. The depth of each of the plural holes 13 may be, for example, 1 nm or more. The upper limit of the depth of each of the holes 13 is not particularly limited. As illustrated in FIG. 1, the surface with the plural holes 13 faces the internal space of the heat storage apparatus 1a. The plural holes 13 are arranged in the entire inner periphery of the heat storage apparatus 1a. The member 12a also serves as a container to contain the heat storage material 11.

The lattice constant L of the clathrate hydrate of TBAB is in the range of about 1.2 nm to about 2.1 nm. The outside diameter of the cage of the clathrate hydrate of TBAB is in the range of about 0.7 nm to about 0.9 nm. For example, in the case where the heat storage material 11 is an aqueous solution of TBAB, the plural holes 13 in the member 12a are preferably spaced at intervals of 1.0 nm to 2.5 nm and each have a hole diameter S of 0.7 to 1.0 nm. In the case where the heat storage material 11 is an aqueous solution of at least one quaternary ammonium salt selected from the group consisting of a tetrabutylammonium salt, a tetrapentylammonium salt, a tetrapropylammonium salt, and a tetraethylammonium salt, the plural holes 13 are spaced at intervals of 1.0 nm to 2.5 nm and each have a hole diameter S of 0.7 nm to 1.0 nm.

Examples of a material for the member 12a include, but are not particularly limited to, metals, metal oxides, and alloys. In the case where the heat storage material 11 is an aqueous solution of a quaternary ammonium salt, for example, the member 12a is composed of at least one material selected from the group consisting of copper, copper(I) oxide, copper(II) oxide, aluminum, zinc, and tin subjected to galvanic corrosion treatment. In this case, the member 12a is in contact with heat storage material 11, facilitating the formation of a clathrate hydrate that contains a quaternary ammonium salt serving as a guest with the plural holes 13.

Figure 3A:
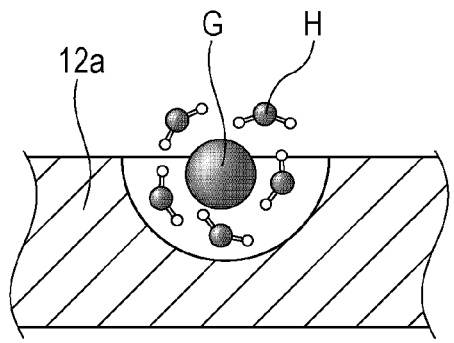
FIG. 3A is a conceptual diagram of the first stage of the formation of a clathrate hydrate.
Figure 3B:
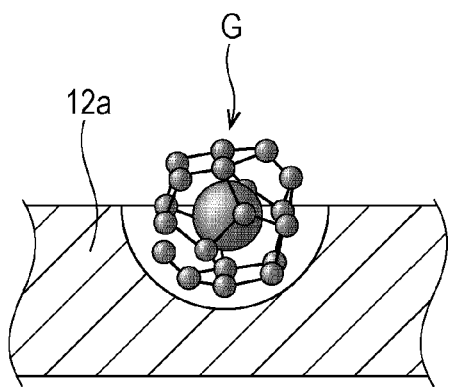
FIG. 3B is a conceptual diagram of the second stage of the formation of the clathrate hydrate.
Figure 3C:
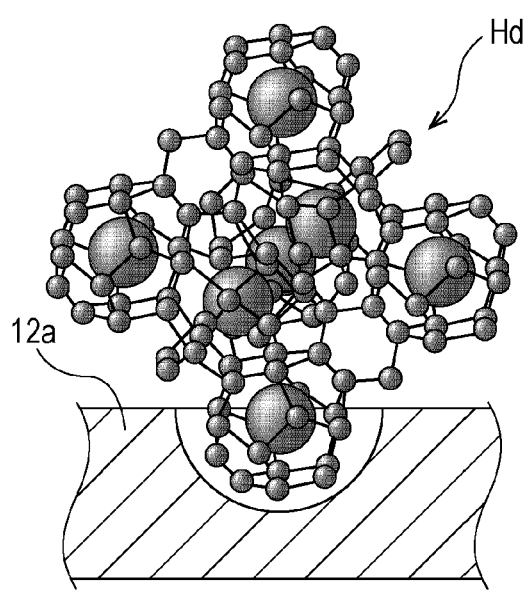
FIG. 3C is a conceptual diagram of the third stage of the formation of the clathrate hydrate.

The use of the heat storage apparatus 1a enables a method for storing heat to be performed. The heat storage material 11 is brought into contact with the member 12a (step 1). The heat storage material 11 and the member 12a are cooled to form at least part of a cage of a clathrate hydrate in the plural holes 13 and to grow the cage into the clathrate hydrate (step 2). Specifically, in the first stage of the step 2 as illustrated in FIG. 3A, the molecule of a guest G and molecules of a host H are freely diffused in the hole 13 in the member 12a. In the second stage of the step 2 as illustrated in FIG. 3B, the diffusion of the collected molecule of the guest G and the molecules of the host H is inhibited with the inner wall of the hole 13 to promote the intermolecular interaction between the guest G and the host H, thereby facilitating the formation of at least part of a cage Ca of a clathrate. The cage Ca is located in the hole 13, thus facilitating the formation of the cage Ca and promoting the crystallization of the heat storage material 11. In the third stage of the step 2 as illustrated in FIG. 3C, thereby, a clathrate hydrate Hd is formed. In the fourth stage of the step 2, other molecules of the clathrate hydrate Hd simultaneously formed near the plural holes 13 coalesce along the surface of the member 12a to promote the crystallization of the heat storage material 11. In this way, the plural holes 13 function as scaffolds that form the clathrate hydrate Hd. To allow the molecules of the clathrate hydrate Hd to coalesce, these crystal planes are preferably matched. Thus, the distance between the holes 13 is preferably an integer multiple of the lattice constant of the clathrate hydrate Hd. As described above, part of the cage of the clathrate is formed in the plural holes 13, thus promoting the formation of the clathrate hydrate, in other words, the crystallization of the heat storage material 11. This suppresses the supercooling of the heat storage material 11.

In the case where the heat storage material 11 is an aqueous solution of a quaternary ammonium salt and the member 12a is composed of a metal or a metal oxide, when a certain type of metal different from the material of the member 12a is also present in the member 12a, it is possible to enhance the effect of suppressing the supercooling of the heat storage material 11. For example, in the case where the member 12a is composed of copper, copper(I) oxide, copper (II) oxide, aluminum, or zinc, when stainless steel is also present, the effect of suppressing the supercooling of the heat storage material 11 is enhanced. In the case where the member 12a is composed of aluminum or zinc, when copper ions are also present, the effect of suppressing the supercooling of the heat storage material 11 is enhanced. In this case, for example, the addition of a $CuCl_2$ or $CuBr_2$ powder to the heat storage material 11 enables copper ions to be present therein. The reason for the enhancement of the effect of suppressing the supercooling of the heat storage material 11 is presumably that regarding different metal materials in the aqueous solution of the quaternary ammonium salt, a surface structure suitable for the promotion of the formation of a clathrate hydrate is formed on a metal surface in the course of a precipitation-dissolution process or adsorption-desorption process of dissolved metal ions on the basis of a difference in ionization tendency.

Refrigerated Air-Conditioning System

Figure 4:
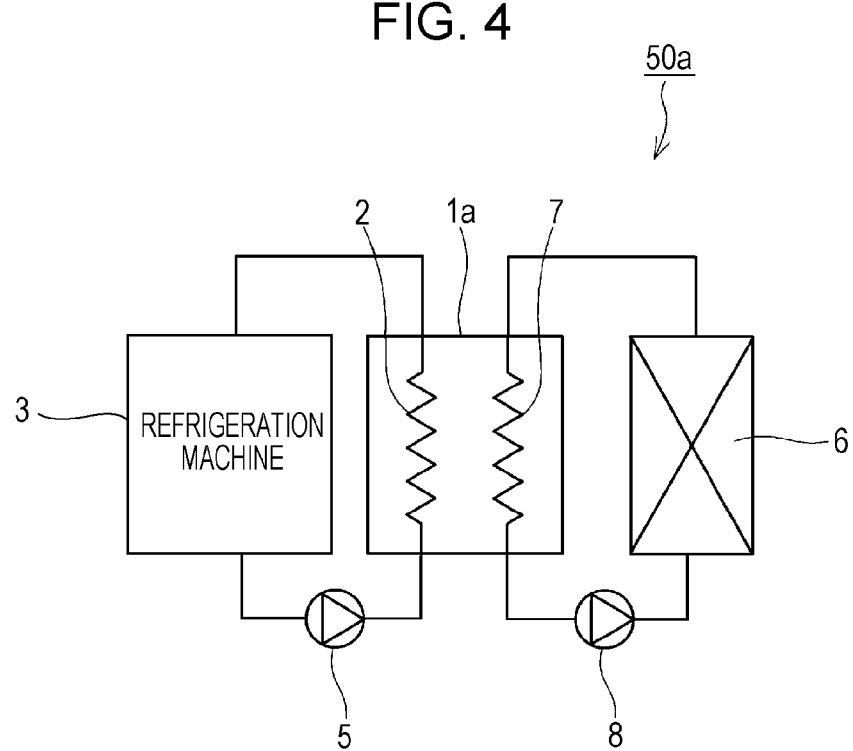
FIG. 4 is a block diagram of a refrigerated air-conditioning system including the heat storage apparatus illustrated in FIG. 1.

As illustrated in FIG. 4, the heat storage apparatus 1a may be used for a refrigerated air-conditioning system 50a. The refrigerated air-conditioning system 50a includes the heat storage apparatus 1a, a heat exchanger 2 for heat storage, a refrigeration machine 3, a pump 5 for heat storage, an indoor heat exchanger 6, a heat exchanger 7 for heat dissipation, and a pump 8 for heat dissipation. The heat exchanger 2 for heat storage and the heat exchanger 7 for heat dissipation are arranged in the internal space of the heat storage apparatus 1a. The heat exchanger 2 for heat storage is a heat exchanger that cools the heat storage material 11. The heat exchanger 7 for heat dissipation is a heat exchanger that takes cold heat stored in the heat storage material 11. The refrigeration machine 3 generates a heating medium that cools the heat storage material 11. The indoor heat exchanger 6 is a heat exchanger that cools the inside of a room.

The refrigerated air-conditioning system 50a operates in two operation modes: a heat storage operation mode and a cooling operation mode. In the heat storage operation mode, the refrigeration machine 3 works to generate the heating medium that cools the heat storage material 11. The temperature of the heating medium is set so as to form a clathrate hydrate by cooling the heat storage material 11. For example, in the case where the heat storage material 11 is an aqueous solution of 40% by weight TBAB, the heating medium has a temperature of about 8° C. The heating medium is fed from the refrigeration machine 3 to the heat exchanger 2 for heat storage with the pump 5 for heat storage. In the heat exchanger 2 for heat storage, the heating medium exchanges heat with the heat storage material 11 to cool the heat storage material 11. The heat storage material 11 is solidified by the cooling while releasing the heat of solidification, so that the heat storage material 11 forms a clathrate hydrate. The heating medium receives the heat of solidification of the heat storage material 11 in the heat exchanger 2 for heat storage and returns to the refrigeration machine 3. In this way, cold heat is stored in the heat storage apparatus 1a. In this case, the member 12a suppresses the supercooling of the heat storage material 11. Thus, in the case where the heat storage material 11 is an aqueous solution of TBAB, the heat storage material 11 is solidified at about 6° C. As illustrated in FIG. 1, the plural holes 13 that serve as starting points of the crystallization of the heat storage material 11 are located at the entire inner periphery of the heat storage apparatus 1a. Thus, the crystallization of the heat storage material 11 is promoted at many sites, thereby rapidly crystallizing the entire heat storage material 11 with supercooling suppressed. This increases COP of the refrigeration machine 3 to reduce the energy consumption of the refrigerated air-conditioning system 50a.

In the cooling operation mode, a heating medium cooled in the heat exchanger 7 for heat dissipation is fed to the indoor heat exchanger 6 with the pump 8 for heat dissipation. The heating medium is cooled by the heat storage material 11 in the heat exchanger 7 for heat dissipation. The heat storage material 11 is gradually melted or heated by receiving heat from the heating medium. The heating medium cooled in the heat exchanger 7 for heat dissipation absorbs heat in the indoor heat exchanger 6 by exchanging heat with indoor air. In this way, the refrigerated air-conditioning in the room is performed. The heating medium whose temperature has been increased by the absorption of heat in the indoor heat exchanger 6 is fed to the heat exchanger 7 for heat dissipation again.

Figure 5:
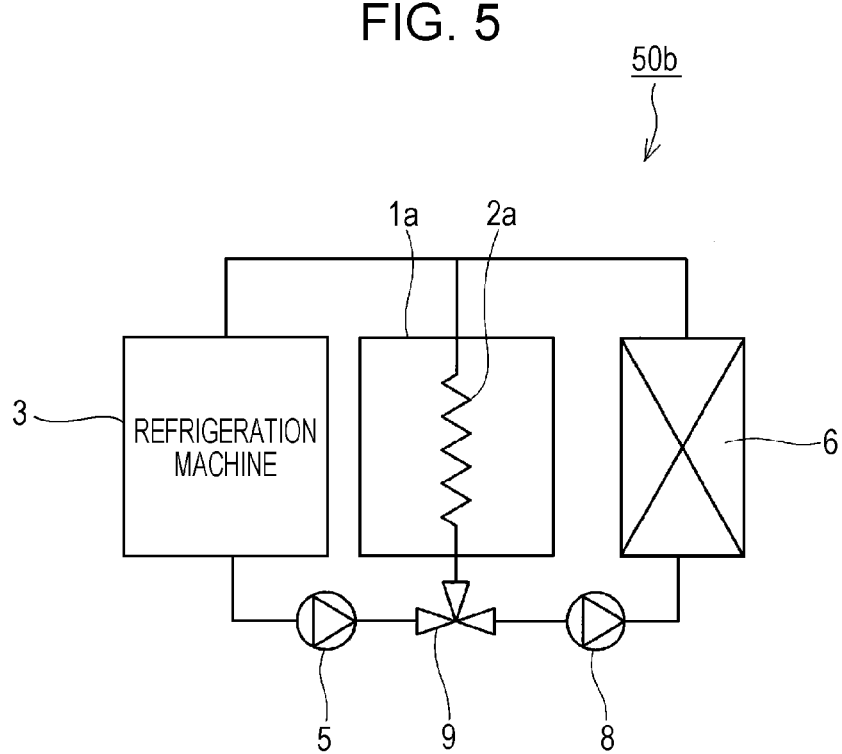
FIG. 5 is a block diagram of another refrigerated air-conditioning system including the heat storage apparatus illustrated in FIG. 1.

The heat storage apparatus 1a may be used for a refrigerated air-conditioning system 50b as illustrated in FIG. 5. In elements of the refrigerated air-conditioning system 50b, the same or equivalent elements as the elements of the refrigerated air-conditioning system 50a are designated using the same reference numerals, and descriptions are not redundantly repeated. The refrigerated air-conditioning system 50b includes a common heat exchanger 2a and a three-way valve 9. The common heat exchanger 2a is arranged inside the heat storage apparatus 1a. The three-way valve 9 is connected to a pipe connected to the common heat exchanger 2a, a pipe connected to the pump 5 for heat storage, and a pipe connected to the pump 8 for heat dissipation. In a heat storage operation, a heating medium generated with the refrigeration machine 3 is fed to the common heat exchanger 2a through the three-way valve 9 with the pump 5 for heat storage. In a heat release operation, the heating medium cooled with the heat storage material 11 in the common heat exchanger 2a is fed to the indoor heat exchanger 6 with the pump 8 for heat dissipation. That is, in the refrigerated air-conditioning system 50b, the common heat exchanger 2a functions as both the heat exchanger 2 for heat storage and the heat exchanger 7 for heat dissipation of the refrigerated air-conditioning system 50a. Thus, the refrigerated air-conditioning system 50b has a simple structure.

Method for Producing Member in Contact with Heat Storage Material

An example of a method for producing the member 12a will be described below. A metal-based material composed of a metal, a metal oxide, or an alloy and a solution that causes pitting corrosion on a surface of the metal-based material are prepared. The solution is brought into contact with the surface of the metal-based material to form a plurality of holes in the surface (step A). Then the pitting corrosion is stopped (step B). In the step B, for example, the pitting corrosion is stopped by stopping the supply of oxygen to the solution that causes pitting corrosion on the surface of the metal-based material. By stopping the pitting corrosion, the degree of the pitting corrosion on the surface of the metal-based material is adjusted, thereby producing the member 12a having a surface shape appropriate for the formation of a clathrate hydrate. The degree of the pitting corrosion may be controlled by the length of time that the surface of the metal-based material is brought into contact with the solution that causes the pitting corrosion on the surface or by adjusting the amount of oxygen in the solution that causes the pitting corrosion on the surface of the metal-based material. The amount of oxygen in the solution that causes the pitting corrosion on the surface of the metal-based material may be adjusted by bubbling an inert gas, such as nitrogen or carbon dioxide, through the solution.

An example of the solution that causes the surface of the metal-based material is, but not particularly limited to, a heat storage material that forms a clathrate hydrate by cooling. In this case, the member 12a may be produced from a few resources. Furthermore, the solution that has been used for the production of the member 12a may be directly used as the heat storage material 11. An example of a heat storage material that may be used as the solution that causes the pitting corrosion on the surface of the metal-based material is an aqueous solution of a quaternary ammonium salt.

In the case where copper is used as a material for the member 12a, for example, a surface of copper may be subjected to pitting corrosion with a 30% to 40% by weight aqueous solution of TBAB. Specifically, a copper component having a predetermined shape, for example, a container- or plate-like shape, is brought into contact with the aqueous solution of TBAB for a predetermined period of time at a predetermined temperature higher than the melting point of the aqueous solution of TBAB (for example, 25° C.). In this case, a protective film, for example, a film composed of copper(I) oxide, copper(II) oxide, or a basic salt, is formed on the surface of the copper component, so that the surface of the copper component is passivated. When dissolved oxygen is present in the aqueous solution of TBAB, the potential of copper is increased by the oxidizing power of oxygen. That is, the copper has an increased potential. When the potential of copper exceeds a potential at which pitting corrosion occurs, the protective film is broken. Copper ions are eluted by a corrosion reaction from broken portions, thereby causing pitting corrosion. When oxygen dissolved in the aqueous solution of TBAB is completely consumed while oxygen is not supplied to the aqueous solution of TBAB, the pitting corrosion is stopped. Thus, the pitting corrosion reaction is controlled in such a manner that the pitting corrosion is stopped when the pitting corrosion proceeds to the extent that the surface shape of the copper component is suitable as that of the member 12a.

For example, the aqueous solution of TBAB is placed in a copper container at 25° C. while open to the atmosphere. The amount of oxygen dissolved in the aqueous solution of TBAB is adjusted to a predetermined amount by bubbling an inert gas, for example, nitrogen or carbon dioxide, through the aqueous solution of TBAB, as needed. If necessary, the inner periphery of the copper container is brought into contact with the aqueous solution of TBAB at a predetermined temperature, for example, 25° C., for a predetermined period of time while open to the atmosphere. Next, the copper container is sealed. The inner periphery of the copper container is brought into contact with the aqueous solution of TBAB at a predetermined temperature, for example, 25° C., for a predetermined period of time. Thereby, the degree of pitting corrosion on the inner periphery of the copper container is controlled in such a manner that the surface shape of the copper container is suitable as that of the member 12a. In the case where a container composed of another metal, such as aluminum, is used in place of the copper container, the member 12a may also be produced by appropriately adjusting the degree of the pitting corrosion. Alternatively, in order to produce the member 12a, the surface of the metal-based material may be subjected to a pitting corrosion reaction by another electrochemical method, another physical method, or another chemical method.

The member 12a may also be produced by subjecting a surface of a metal to galvanic corrosion treatment. The galvanic corrosion indicates a phenomenon in which when metals having different potential are brought into contact with each other in an electrolytic solution, such as water, the metal having a lower potential corrodes. The period of time for the galvanic corrosion treatment is determined in such a manner that the surface shape of the metal is suitable as that of the member 12a. The galvanic corrosion treatment may be advantageously employed when the member 12a is produced from a material that does not easily corrode, for example, a material composed of tin or a material in which aluminum is clad with zinc.

Modification

Figure 6:
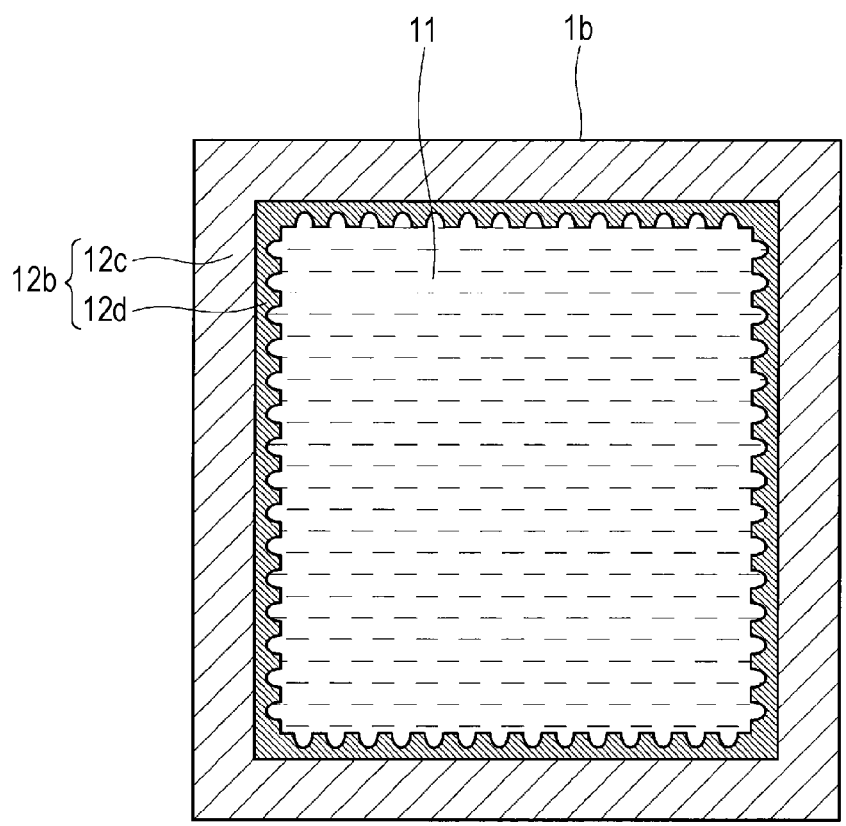
FIG. 6 is a cross-sectional view of a heat storage apparatus according to a first modification.

The heat storage apparatus 1a may be changed from various points of view. For example, the heat storage apparatus 1a may be changed as illustrated in FIG. 6. A heat storage apparatus 1b according to a first modification includes the heat storage material 11 and a member 12b. The member 12b includes a substrate 12c and a thin film 12d arranged on the substrate 12c. The thin film 12d is in contact with the heat storage material 11 inside the heat storage apparatus 1b. The thin film 12d has a surface with the same structure as that of the surface of the member 12a. In the heat storage apparatus 1b, thus, the formation of a clathrate hydrate, that is, the crystallization of the heat storage material 11, is promoted for the same reason as described with respect to the heat storage apparatus 1a. As a result, the supercooling of the heat storage material 11 is suppressed. The thin film 12d has a thickness of, for example, 1 nm to 1 um. The thin film 12d has a small thickness. Thus, an increase in the thermal conduction resistance of walls of the heat storage apparatus 1b due to the thin film 12d is inhibited. This results in satisfactory thermal responsiveness of the heat storage apparatus 1b.

The thin film 12d is formed of, for example, a mesoporous silica thin film. Such a mesoporous silica thin film may be formed by, for example, an immersion method (hydrothermal synthesis method), a solvent evaporation method, e.g., a dip coating method or a spin coating method, or a vapor synthesis method. Specifically, the thin film 12d may be formed as described below. A surfactant is applied to the inner periphery of a metal container serving as the substrate 12c to form a surfactant thin film. The vapor of tetraethoxysilane (TEOS) serving as a silica source is fed inside the metal container and brought into contact with the surfactant thin film, thereby forming the thin film 12d. A higher vapor temperature of TEOS (for example, 70° C. or higher) results in a mesoporous silica thin film having a small amount of residual silanoal groups and excellent mechanical strength as the thin film 12d. Alternatively, the heat storage apparatus 1b may be produced by forming the thin films 12d on surfaces of metal plates to be formed into the substrate 12c by the spin coating method or the immersion method and assembling the metal plates.

The thin film 12d may be formed of a mesoporous aluminosilicate thin film from the viewpoint of achieving good heat resistance or acid resistance. The mesoporous aluminosilicate thin film may be formed by a known method. The thin film 12d may be formed of a mesoporous carbon thin film. The mesoporous carbon thin film may be formed by a known method, for example, a method using mesoporous silica serving as a template.

Figure 7:
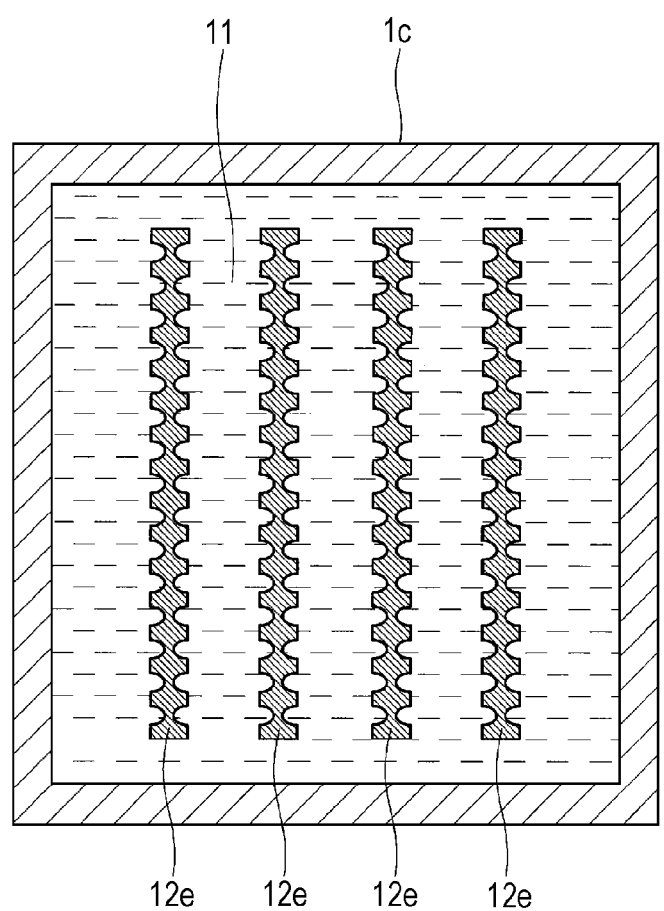
FIG. 7 is a cross-sectional view of a heat storage apparatus according to a second modification.

The heat storage apparatus 1a may be changed as illustrated in FIG. 7. A heat storage material 1c according to a second modification includes the heat storage material 11 and members 12e. The members 12e have a plate-like shape. The plural members 12e are arranged inside the heat storage material 1c. Both main surfaces of each of the members 12e have the same structure as that of the member 12a. In the heat storage material 1c, thus, the formation of a clathrate hydrate, that is, the crystallization of the heat storage material 11, is promoted for the same reason as described with respect to the heat storage apparatus 1a. As a result, the supercooling of the heat storage material 11 is suppressed. Furthermore, the members 12e may be arranged in the middle portion of the heat storage material 11, thus rapidly crystallizing the entire heat storage material 11.

To increase the amount of heat storage of the heat storage material 11, each of the members 12e preferably has a smaller thickness. Each of the members 12e has a thickness of, for example, 10 μm to 1 mm from this point of view. Examples of a material for the members 12e include metals, metal oxides, alloys, silica gels, zeolites, activated carbon, mesoporous silica, mesoporous aluminosilicate, mesoporous carbon, and materials used as ultrafiltration membranes. The members 12e may be formed by coating thin films on substrates.

EXAMPLES

While the present disclosure will be described in detail below by examples, the present disclosure is not limited to these examples described below.

Sample A-1

A copper plate with dimensions of 8 mm×4 mm×0.5 mm was placed in a glass sample bottle containing 2.0 g of a 40% by weight aqueous solution of TBAB. The copper plate was immersed in the aqueous solution of TBAB at about 25° C. for 24 hours with the cap of the sample bottle closed. In this way, the copper plate was subjected to surface-roughening treatment to provide sample A-1. Then sample A-1 was placed and cooled on a cooling plate with a temperature of 6° C. At this time, the aqueous solution of TBAB was crystallized on a surface of the copper plate. The aqueous solution of TBAB in sample A-1 was crystallized for 5 minutes after the time when the liquid temperature of sample A-1 reached 6° C. Here, in order not to affect the crystallization of the aqueous solution of TBAB by a thermocouple, the time when the liquid temperature of sample A-1 reached 6° C. was determined without using any thermocouple. Specifically, a reference sample similar to sample A-1 was placed and cooled on the cooling plate. The liquid temperature of the reference sample was measured with a thermocouple. Thereby, the relationship between the cooling time and the liquid temperature of the reference sample was determined in advance. The time when the liquid temperature of sample A-1 reached 6° C. was estimated on the basis of the resulting relationship between the cooling time and the liquid temperature of the reference sample. The copper plate was taken from sample A-1 immediately after the surface-roughening treatment. A surface of the copper plate was observed with an atomic force microscope (AFM). The observation results demonstrate that a plurality of holes are spaced at intervals of 1.0 nm to 2.5 nm in the surface of the copper plate, each of the holes having a diameter S of 0.7 nm to 1.0 nm.

Sample A-2

A copper plate with dimensions of 8 mm×4 mm×0.5 mm was immersed in a 12% by weight nitric acid solution at normal temperature for 5 minutes. The copper plate was then placed in a glass sample bottle containing 2.0 g of a 40% by weight aqueous solution of TBAB. A cap of the sample bottle was closed to provide sample A-2. In this case, the entire surface of the copper plate appeared to be corroded by the nitric acid solution. Although sample A-2 was placed and cooled on a cooling plate with a temperature of −2° C., the aqueous solution of TBAB in sample A-2 was not crystallized. When sample A-2 was placed and cooled on the cooling plate with a temperature of −6° C., the aqueous solution of TBAB in sample A-2 was crystallized. The results of samples A-1 and A-2 suggested that appropriate surface-roughening treatment should suppress the supercooling of the aqueous solution of TBAB.

Samples B-1 to B-8

A copper plate with dimensions of 8 mm×4 mm×0.5 mm was heated at 250° C. for 60 minutes while open to the atmosphere, thereby providing a copper plate with an oxidized surface. The copper plate with the oxidized surface was placed in a glass sample bottle containing 2.0 g of a 40% by weight aqueous solution of TBAB. The cap of the sample bottle was closed. The copper plate with the oxidized surface was immersed in the aqueous solution of TBAB at room temperature (about 10° C.) for 1 hour. In this way, the copper plate with the oxidized surface was subjected to surface-roughening treatment to provide sample B-1. Samples B-2 to B-8 were produced as in sample B-1, except that the time (time TS) that the copper plate with the oxidized surface was immersed in the aqueous solution of TBAB at room temperature was changed. The times TS for samples B-2, B-3, B-4, B-5, B-6, B-7, and B-8 were set to 20 hours, 44 hours, 69 hours, 97 hours, 121 hours, 145 hours, and 168 hours, respectively. Each of the samples was placed and cooled on the cooling plate with a temperature of 6° C. In all samples, the aqueous solutions of TBAB were crystallized on the oxidized surfaces of the copper plates. In each of the samples, the time required for the crystallization of the aqueous solution of TBAB from the time when the liquid temperature of each sample reached 6° C. was evaluated according to the following three evaluation criteria, as listed in Table 1. The time when the liquid temperature of each sample reached 6° C. was determined in the same way as in sample A-1.

Excellent: The time required for the crystallization of the aqueous solution of TBAB is 20 minutes or less.
Good: The time required for the crystallization of the aqueous solution of TBAB is in the range of 20 minutes to 60 minutes.
Fair: The time required for the crystallization of the aqueous solution of TBAB is 60 minutes or more.

TABLE 1

| Sample | Immersion time (time TS) [hour] | Time required for crystallization of aqueous solution of TBAB |
|---|---|---|
| B-1 | 1 | fair |
| B-2 | 20 | excellent |
| B-3 | 44 | excellent |
| B-4 | 69 | good |
| B-5 | 97 | good |
| B-6 | 121 | fair |
| B-7 | 145 | good |
| B-8 | 168 | fair |

The results listed in Table 1 suggested that the adjustment of the time required for the immersion of the copper plate with the oxidized surface in the aqueous solution of TBAB should shorten the time required for the crystallization of the aqueous solution of TBAB from the start of the cooling.

Sample C

Sample C was produced as sample A-1, except that an aluminum plate with dimensions of 8 mm×4 mm×0.5 mm was used in place of the copper plate. Sample C was placed and cooled on the cooling plate with a temperature of 1° C. In this case, the aqueous solution of TBAB was crystallized on a surface of the aluminum plate. The aqueous solution of TBAB in sample C was crystallized 90 minutes after the time when the liquid temperature of sample C reached 1° C. The time when the liquid temperature of sample C reached 1° C. was determined in the same way as in sample A-1.

Sample D

Sample D was produced as sample A-1, except that a zinc plate with dimensions of 8 mm×4 mm×0.5 mm was used in place of the copper plate. Although sample D was placed and cooled on the cooling plate with a temperature of 6° C., the aqueous solution of TBAB was not crystallized. When sample D was placed and cooled on the cooling plate with a temperature of 1° C., the aqueous solution of TBAB was crystallized on a surface of the zinc plate. In this case, the aqueous solution of TBAB in sample D was crystallized 120 minutes after the time when the liquid temperature of sample D reached 1° C. The time when the liquid temperature of sample D reached 1° C. was determined in the same way as in sample A-1.

Sample E-1

Sample E-1 was produced as sample A-1, except that a tin plate with dimensions of 8 mm×4 mm×0.5 mm was used in place of the copper plate. When sample E-1 was placed and cooled on the cooing plate with a temperature of 0° C., the aqueous solution of TBAB was not crystallized. When sample E-1 was placed and cooled on the cooing plate with a temperature of −6° C., the aqueous solution of TBAB was crystallized. In this case, the aqueous solution of TBAB in sample E-1 was crystallized 9 minutes after the time when the liquid temperature of sample E-1 reached −6° C. The time when the liquid temperature of sample E-1 reached −6° C. was determined in the same way as in sample A-1. Tin is not easily corroded. Thus, in sample E-1, substantially no pitting corrosion occurred in the tin plate.

Sample E-2

A tin plate with dimensions of 8 mm×4 mm×0.5 mm was immersed in a 25% by weight hydrochloric acid at normal temperature for 15 minutes. The tin plate was placed in a glass bottle containing 2.0 g of a 40% by weight aqueous solution of TBAB. A cap of the sample bottle was closed to provide sample E-2. In this case, the entire surface of the tin plate was seemingly corroded by the hydrochloric acid. When sample E-2 was placed and cooled on a cooling plate with a temperature of −2° C., the aqueous solution of TBAB in sample E-2 was not crystallized. When sample E-2 was placed and cooled on the cooling plate with a temperature of −6° C., the aqueous solution of TBAB in sample E-2 was crystallized.

Sample E-3

A tin plate with dimensions of 8 mm×4 mm×0.5 mm was immersed in an equivolume mixture of a 30% by weight solution of a tin solder stripping agent (TOP RIP LT-2, manufacture by Okuno Chemical Industries Co., Ltd.) and a 20% by weight nitric acid solution at normal temperature for 30 seconds. The tin plate was placed in a glass bottle containing 2.0 g of a 40% by weight aqueous solution of TBAB. A cap of the sample bottle was closed to provide sample E-3. In this case, the entire surface of the tin plate was seemingly corroded by the foregoing mixture. When sample E-3 was placed and cooled on a cooling plate with a temperature of −2° C., the aqueous solution of TBAB in sample E-3 was not crystallized. When sample E-3 was placed and cooled on the cooling plate with a temperature of −6° C., the aqueous solution of TBAB in sample E-3 was crystallized.

Sample E-4

A tin plate with dimensions of 8 mm×4 mm×0.5 mm and a silver member with dimensions of 10 mm×5 mm×0.5 mm were immersed in a 30% by weight aqueous solution of TBAB at 70° C. for 30 minutes while the tin plate was in contact with the silver member. In this way, the tin plate was subjected to galvanic corrosion treatment. Next, only the tin plate that had been subjected to the galvanic corrosion treatment was placed in a glass bottle containing 2.0 g of a 40% by weight aqueous solution of TBAB, thereby providing sample E-4. Sample E-4 was placed and cooled on a cooling plate with a temperature of 0° C. In this case, the aqueous solution of TBAB was crystallized on a surface of the tin plate. The aqueous solution of TBAB in sample E-4 was crystallized 28 minutes after the time when the liquid temperature of sample E-4 reached 0° C. The time when the liquid temperature of sample E-4 reached 0° C. was determined in the same way as in sample A-1. The results of samples E-1 to E-4 suggested that subjecting the tin plate to the galvanic corrosion treatment should suppress the supercooling of the aqueous solution of TBAB.

Sample F-1

Into a glass sample bottle containing 2.0 g of a 40% by weight aqueous solution of TBAB, 60 mg of an L-type zeolite (pore size: 0.2 nm×0.2 nm×0.75 nm, trade name: HSZ-500KOA, manufacture by Tosoh Corporation) was charged. A cap of the sample bottle was closed to provide sample F-1. When sample F-1 was placed and cooled on a cooling plate with a temperature of 3° C., the aqueous solution of TBAB in sample A-2 was not crystallized. When sample F-1 was placed and cooled on the cooling plate with a temperature of 1° C., the aqueous solution of TBAB was crystallized on a surface of the L-zeolite. The aqueous solution of TBAB in sample F-1 was crystallized 10 minutes after the time when the liquid temperature of sample F-1 reached 1° C. The time when the liquid temperature of sample F-1 reached 1° C. was determined in the same way as in sample A-1.

Sample F-2

Into a glass sample bottle containing 2.0 g of a 40% by weight aqueous solution of TBAB, 60 mg of an X-type zeolite (open pore size: 0.74 nm, trade name: Zeolum F-9, manufacture by Tosoh Corporation) was charged. A cap of the sample bottle was closed to provide sample F-2. When sample F-2 was placed and cooled on a cooling plate with a temperature of 3° C., the aqueous solution of TBAB was crystallized on a surface of the X-type zeolite. The aqueous solution of TBAB in sample F-2 was crystallized 15 minutes after the time when the liquid temperature of sample F-2 reached 3° C. The time when the liquid temperature of sample F-2 reached 3° C. was determined in the same way as in sample A-1.

Sample G

Into a glass sample bottle, 2.0 g of a 40% by weight aqueous solution of TBAB alone was charged. A cap of the sample bottle was closed to provide sample G. When sample G was placed and cooled on a cooling plate with a temperature of −2° C., the aqueous solution of TBAB was not crystallized. When sample G was placed and cooled on a cooling plate with a temperature of −6° C., the aqueous solution of TBAB was crystallized 1 minute after the time when the liquid temperature of sample G reached −6° C. The time when the liquid temperature of sample G reached −6° C. was determined in the same way as in sample A-1.

Sample H

A copper plate with dimensions of 8 mm×4 mm×0.5 mm was placed in a glass bottle containing 2.0 g of a 40% by weight aqueous solution of TBAB. The copper plate was immersed in the aqueous solution of TBAB at 25° C. for 24 hours with a cap of the sample bottle closed. The copper plate was taken and placed in a glass bottle containing 2 g of a 19% by weight aqueous solution of tetrahydrofuran (THF). A cap of the sample bottle was closed to provide sample H. Note that the 19% by weight aqueous solution of THF has a melting point of 4.9° C. and forms a clathrate hydrate by cooling. When sample H was placed and cooled on a cooling plate at a cooling rate of 1° C./minute, the aqueous solution of THF was crystallized on a surface of the copper plate at the time when the temperature reached 3.3° C.

Sample I

Into a glass bottle, 2 g of a 19% by weight aqueous solution of THF alone was charged. A cap of the sample bottle was closed to provide sample I. When sample I was cooled in an environment with a temperature of 0° C., the aqueous solution of THF was not crystallized. When sample I was placed and cooled on a cooling plate at a cooling rate of 1° C./minute, the aqueous solution of THF was crystallized at the time when the temperature reached −13.7° C.

The results of samples H and I suggested that the use of the copper plate subjected to the surface-roughening treatment should suppress the supercooling of the aqueous solution of THF. The lattice constant of a THF clathrate hydrate is in the range of about 1.0 nm to about 1.7 nm. The outside diameter D of a cage of the THF clathrate hydrate is in the range of 0.78 nm to 0.95 nm. The copper plate immersed in the aqueous solution of TBAB seemingly had a surface structure suitable for the promotion of the formation of the THF clathrate hydrate, thereby suppressing the supercooling of the aqueous solution of THF.

The heat storage apparatus according to the present disclosure has a high heat storage density and thus is usable for applications, such as systems that utilize heat storage, for example, cold storage-type air-conditioners, and housing materials that utilize heat storage.

What is claimed is:

1. A heat storage apparatus comprising:
   a heat storage material that forms a clathrate hydrate by cooling; and
   a member having a surface with a plurality of holes, the plurality of holes being spaced at intervals of 1L to 10L, and each of the plurality of holes having a hole diameter of 1D to 20D, in the case that the lattice constant of the clathrate hydrate is denoted by L and the outside diameter of a cage included in the clathrate hydrate is denoted by D.

2. The heat storage apparatus according to claim 1, wherein the heat storage material is an aqueous solution of a quaternary ammonium salt.

3. The heat storage apparatus according to claim 2, wherein the quaternary ammonium salt is a tetraalkylammonium salt including at least one alkyl group selected from the group consisting of a methyl group, an ethyl group, a n-propyl group, an isopropyl group, a n-butyl group, an isobutyl group, a n-pentyl group, an isopentyl group, a n-hexyl group, an isohexyl group, a n-heptyl group, an isoheptyl group, and a tri-n-butylpentyl group and at least one ammonium salt selected from the group consisting of an ammonium bromide salt, an ammonium chloride salt, an ammonium fluoride salt, an ammonium nitrate, an ammonium nitrite salt, an ammonium chlorate salt, an ammonium perchlorate, an ammonium bromate salt, an ammonium iodate salt, an ammonium carbonate salt, an ammonium phosphate salt, an ammonium tungstate salt, an ammonium sulfate salt, an ammonium hydroxide salt, an ammonium carboxylate salt, an ammonium dicarboxylate salt, an ammonium sulfonate salt, and an ammonium disulfonate salt.

4. The heat storage apparatus according to claim 3, wherein each of the plurality of holes has a hole diameter of 0.7 nm to 1.0 nm, and the plurality of holes are spaced at intervals of 1.0 nm to 2.5 nm.

* * * * *